March 24, 1942.  A. Y. DODGE  2,277,214

TRANSMISSION

Filed April 27, 1940   3 Sheets-Sheet 3

INVENTOR
*ADIEL Y. DODGE*
BY *McConkey & Booth*
ATTORNEYS

Patented Mar. 24, 1942

2,277,214

UNITED STATES PATENT OFFICE 2,277,214

TRANSMISSION

Adiel Y. Dodge, Rockford, Ill.

Application April 27, 1940, Serial No. 331,911

8 Claims. (Cl. 74—189.5)

This invention relates to transmissions and more particularly to variable torque and speed transmissions adapted for use in automotive vehicles.

One of the objects of the invention is to provide a transmission which has a plurality of operating ranges having different speed and torque characteristics. According to one important feature the transmission includes an infinitely variable speed device which may drive through a reducing gear in one range and which may be connected in a two path arrangement with a differential gear set to drive in another range.

Another object of the invention is to provide a transmission including a variable speed device connectible to drive directly or in a two path arrangement in which the change in connections may be made by an operator at will.

Still another object of the invention is to provide a transmission including a gear arrangement for forming a plurality of different driving connections which embodies a minimum number of parts.

Still another object of the invention is to provide a transmission which will yieldingly resist rotation of the driven shaft to provide a braking effect. This is particularly useful in connection with vehicles descending steep grades or the like.

The above and other objects, advantages and novel features of the invention will be apparent from the following description of the embodiments illustrated in the accompanying drawings, in which.

Figure 1:
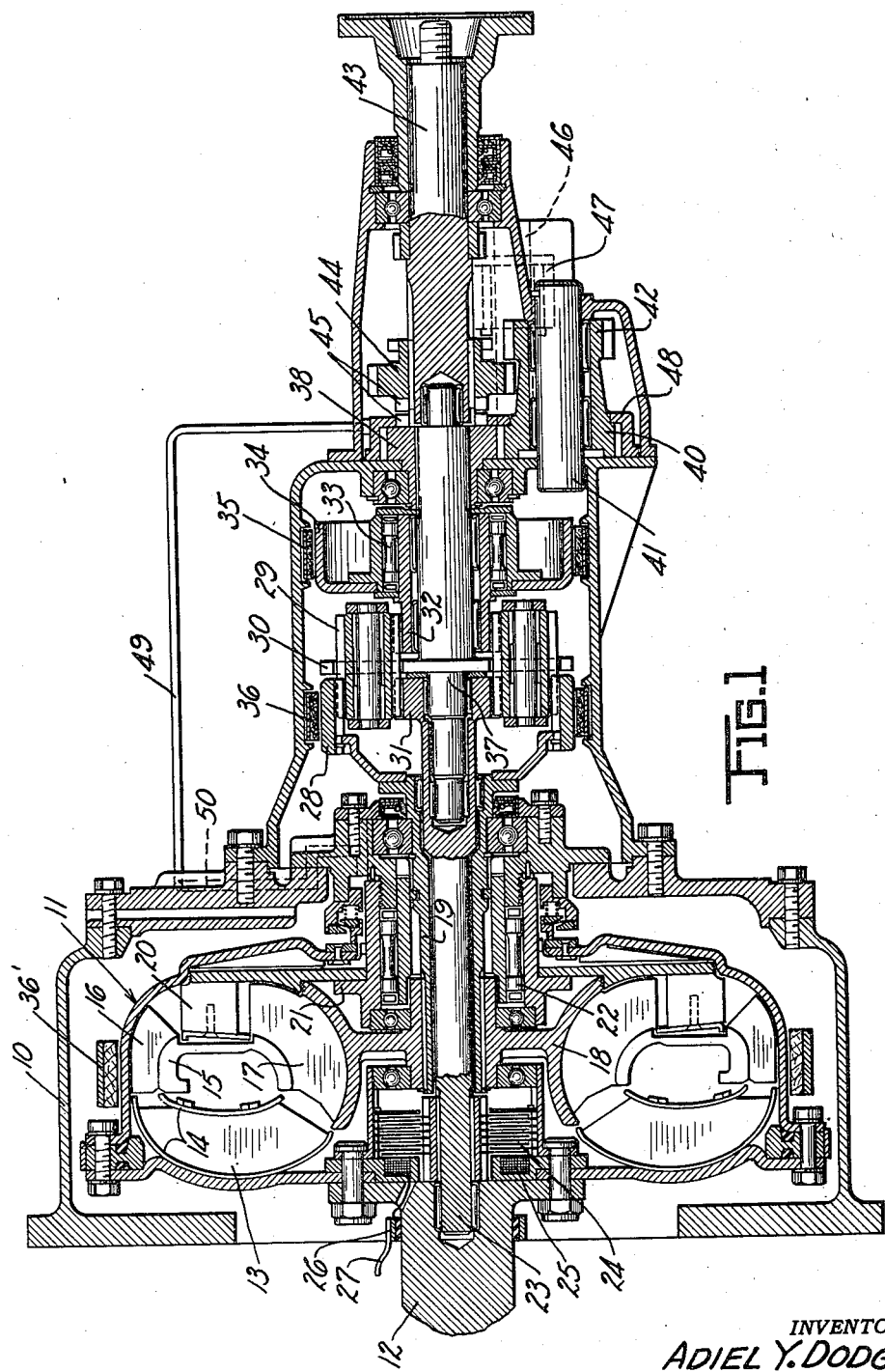
Figure 1 is an axial section of a transmission embodying the invention.

The transmission illustrated in Figure 1 comprises an outer casing 10 which may be mounted on a vehicle and which incloses an infinitely variable speed transmission illustrated generally at 11. The transmission 11 includes a housing connected to the flanged end of a driving shaft 12, which may be the crank shaft of an internal combustion engine or the like. A series of impeller vanes 13 connected at their inner and outer edges by stamped rings 14 are secured in the impeller casing. The inner ring 14 forms a part of a central core which is completed by a rotor ring 15 carrying an outer set of blades or vanes 16, and an inner set of vanes 17. The edges of the vanes 17 are supported on a hub member 18, which is splined to a sleeve 19. Between the sets of vanes 16 and 17 there is mounted a set of stator vanes 20 supported through a hub 21 on a combined one-way clutch and bearing 22 which permits the stator to turn forwardly, but prevents it from turning rearwardly.

Alined with the drive shaft 12 is an intermediate shaft 23 journalled at one end in the driving shaft and extending through the sleeve 19. The shaft 23 may be connected to the driving shaft by a clutch 24 controlled by a solenoid 25. As shown, the solenoid 25 is grounded on one side to the transmission casing, and is connected on its other side to a slip ring 26 engaged by a brush 27. The live side of a grounded circuit may be connected to the brush 27, through a switch, not shown, which may be operated by an operator at any desired control point in the vehicle.

The shaft 19 is connected to one element of a differential gear set shown as a ring gear 28 which meshes with one end of a series of elongated planet gears 29 carried by a gear carrier 30. The shaft 23 terminates in a sun pinion 31 also meshing with the planet gears 29. A second sun pinion 32 meshes with the planet gears 39, and is connected through a one-way clutch 33 with a brake drum 34. A brake 35 controllable by the operator is engageable with the brake drum 34 to hold it stationary when desired, and a similar brake 36 may be provided to engage and hold the ring gear 28.

The gear carrier 30 is integrally connected to a shaft 37 which is formed with or connected to a driving pinion 38. The pinion 38 meshes with a pinion 40 formed on a sleeve on a lay shaft 41, which sleeve has also formed thereon a second pinion 42. A driven shaft 43 coaxial with the shafts 12, 23 and 37, has splined thereon a driven gear 44 which is shiftable through a yoke mechanism or the like, not shown, into or out of mesh with the gear 42. The gears 38 and 44 carrying cooperating clutch members 45 may be directly connected when desired. A second shaft 46 parallel to the shafts 43 and 41 carries a reverse idler 47, which may be shifted into mesh with both the gears 42 and 44 to provide reverse drive when desired.

The transmission as described provides four forward operating ranges and one reverse drive. In the first range the pinion 44 is shifted into mesh with the gear 42, the brake 35 is engaged, and the clutch 24 is disengaged. In this position, torque from the shaft 12 is transmitted to the impeller 13 and through liquid in the hydraulic torque converter 11 to the rotor 18 and sleeve 19 to drive the ring gear 28. Since the clutch 24 is disengaged the pinion 31 is free, but the pinion 32 is prevented from reverse rotation by the one-way clutch 33 and the brake 35, so that the planet pinions 29 and the carrier 30 are caused to turn around the transmission axis at reduced speed. This drives the gear 38, which in turn drives the gears 40 and 42, and back to the driven shaft 43 through the driven gear 44. Thus the driven shaft 43 will be driven at a greatly reduced speed and increased torque from the driving shaft 12. The speed and torque ratios will vary depending upon the driving condition in the hydraulic torque converter which varies automatically in accordance with speed and torque load, the speed ratio varies from zero to substantially one to one.

A second and higher driving range can be obtained by shifting the gear 44 out of mesh with the gear 42 and to a position to engage the clutch 45. In this position the driving connections up to the gear 38 are identical with those described above, but torque from the gear 38 is transmitted directly at one to one ratio through the clutch 45 to the driven shaft. This provides a somewhat higher speed range with torque multiplications occurring in the hydraulic torque converter 11 and in the gear sets 28—32.

A different driving range may be obtained by again shifting the gear 44 into mesh with the gear 42, disengaging the brake 35 and engaging the clutch 24. In this position the sun pinion 31 is driven directly by the driving shaft 12 and the ring gear 28 is driven as before through the hydraulic torque converter. Thus a two path drive of the type more particularly described and claimed in my copending application Serial No. 723,083, filed April 30, 1934, is provided for the carrier 30, and the shaft 37. The gear 38 will be driven at torque and speed ratios varying automatically up to one to one, and will drive the driven shaft through gears 40, 42 and 44 at reduced speed and increased torque.

The fourth speed ratio is provided by again shifting the gear 44 to engage the clutch 45. At this time the drive shaft 43 is connected to the driving shaft 12 through a two path arrangement as described in my copending application Serial No. 723,083 at ratios up to substantially one to one.

For reverse drive the idler pinion 47 is shifted into mesh with both gears 42 and 44 to reverse the direction of drive from the gear 38 to the driven shaft 43. Two speeds of reverse may be obtained by engaging the brake 35 and disengaging clutch 24, or by disengaging brake 35 and engaging clutch 24. The brake 36 may be employed to brake the ring gear 28 to facilitate shifting of the gear 44 and may also be utilized in braking the vehicle as for example, in descending steep grades. When this brake is engaged the ring gear 28 is prevented from rotating and if the clutch 24 is also disengaged no torque will be transmitted to the gear 38. Since there is, at this time, no load on the gear 38 or the associated gears 40, 42 or 44, they may readily be shifted as desired. In descending a steep grade where engine braking is desired, the brake 36 may be engaged to hold the ring gear 28 stationary. At this time, assuming the clutch 24 to be engaged, the reaction torque from the driven shaft will be transmitted at an increased speed ratio to the driving shaft 12, so that engine braking will be fully effective. At the same time, holding of the rotor creates an additional hydraulic braking in the torque converter tending to slow the vehicle.

An alternative or supplementary arrangement for braking the vehicle is shown in Figure 1 in the form of a brake 36' engageable with the outer impeller housing of the hydraulic unit 11. When brake 36 and clutch 24 are engaged as described above, the brake 36' may be utilized to increase the resistance to turning of the driving shaft. Preferably, however, the brake 36' and clutch 24 are engaged when brake 36 is disengaged or omitted to stall the driving shaft. At this time rotation of the driven shaft turns the rotor at high speed through the gearing and circulates fluid in the vane circuit. The fluid reacts against the stalled impeller vanes and creates a high resistance to turning of the rotor and driven shaft. Still another method of hydraulic braking by locking the stator is disclosed and claimed in my copending application Serial No. 334,705, filed May 13, 1940.

In operating the transmission of Figure 1 it is desirable to maintain a circulation of liquid through the hydraulic torque converter and for this purpose the meshing gears 38 and 40 are encased by a housing 48 so as to form a gear pump. The inlet of the gear pump may open into the lower portion of the gear housing and its outlet may be connected through a pipe 49 to a passage 50 formed in the housing 10. From the passage 50 liquid flows into the impeller casing of the torque converter 11 passing between the stator hub and the impeller casing and entering the fluid circuit formed by the vanes. Liquid will leave the circuit between the impeller and rotor vanes and will flow through the various bearings around the shaft 23 and back to the gear casing. Thus, a constant circulation of liquid is maintained through the torque converter at all times during operation, and the same liquid may serve to lubricate the bearings, gears, and other parts of the transmission. If desired, other liquid circulating systems such as that disclosed and claimed in my Patent No. 2,149,117 can be employed instead of that described above.

Figure 2:
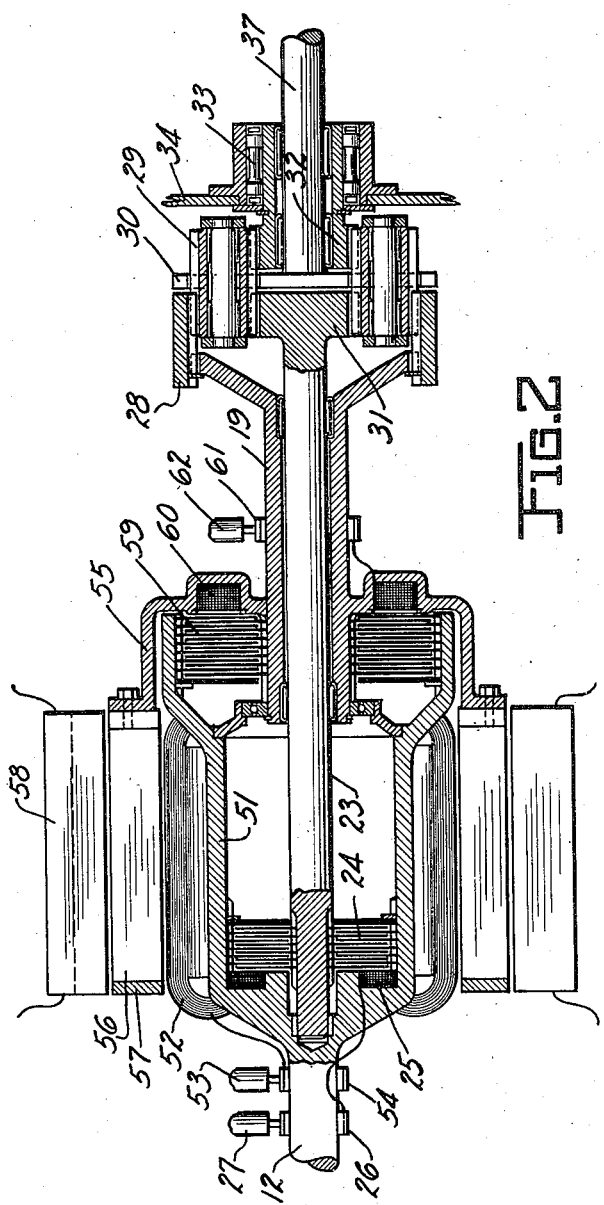
Figure 2 is a partial view similar to Figure 1 illustrating another construction.

The transmission of Figure 2 includes gear parts substantially identical to those of Figure 1 and corresponding parts in both figures have been indicated by the same reference numerals. In this construction an electro-magnetic variable speed device is substituted for the hydraulic torque converter 11 and comprises a driving member 51 connected to the driving shaft 12. The member 51 carries a series of coils 52 which may be energized from any convenient source through a brush 53 and a slip ring 54 mounted on but insulated from the shaft 12. The driven member is connected to the sleeve 19 and comprises a head 55 carrying a series of bars 56 which may be alternately iron and copper bars, and which are short circuited at their ends by a ring 57. A stationary stator core 58 is shown mounted outside of the bars 56 and may carry a series of windings excited by the flux produced upon rotation of the bars 56.

The driving member 51 may be directly connected, when desired, to the shaft 23 through clutch 24 actuated by a coil 25 which is in turn energized through slip ring 26 and brush 27. A second clutch 59 controlled by a coil 60, which is energized through a slip ring 61 and brush 62, may be provided between the driving member 51 and the sleeve 19 to connect these to members directly when desired.

In operation with both clutches 24 and 59 disengaged, the driving member 51 will rotate the coils 52 relative to the bars 56 creating a magnetic drag on the bars to turn the sleeve 19 at reduced speed. If the stator core 58 is omitted the device will operate in the manner of a magnetic clutch to transmit the torque of the driving shaft to the ring gear 28 at reduced speed, but where the stator core 58 is provided it acts as a reaction member enabling the torque of the driving shaft to be multiplied. This range corresponds substantially to the first and second ranges described above in connection with Figure 1.

When the clutch 24 is engaged the pinion 31 is driven directly by the driving shaft, and the ring gear 28 is driven through the magnetic device as described above. This provides a two-path power flow corresponding to the third and fourth ranges described in connection with Figure 1. Should it be desired, in either of the positions of clutch 24 to eliminate all slippage between the drive member 51 and the driven member 56, clutch 59 may be engaged to connect these two members mechanically. If the clutch 24 is engaged simultaneously a direct one to one drive between the driving shaft 12 and the shaft 37 will be produced, while if the clutch 24 is disengaged the shaft 37 will be driven at reduced speed, and increased torque through the gears 28, 29 and 32.

Figure 3:
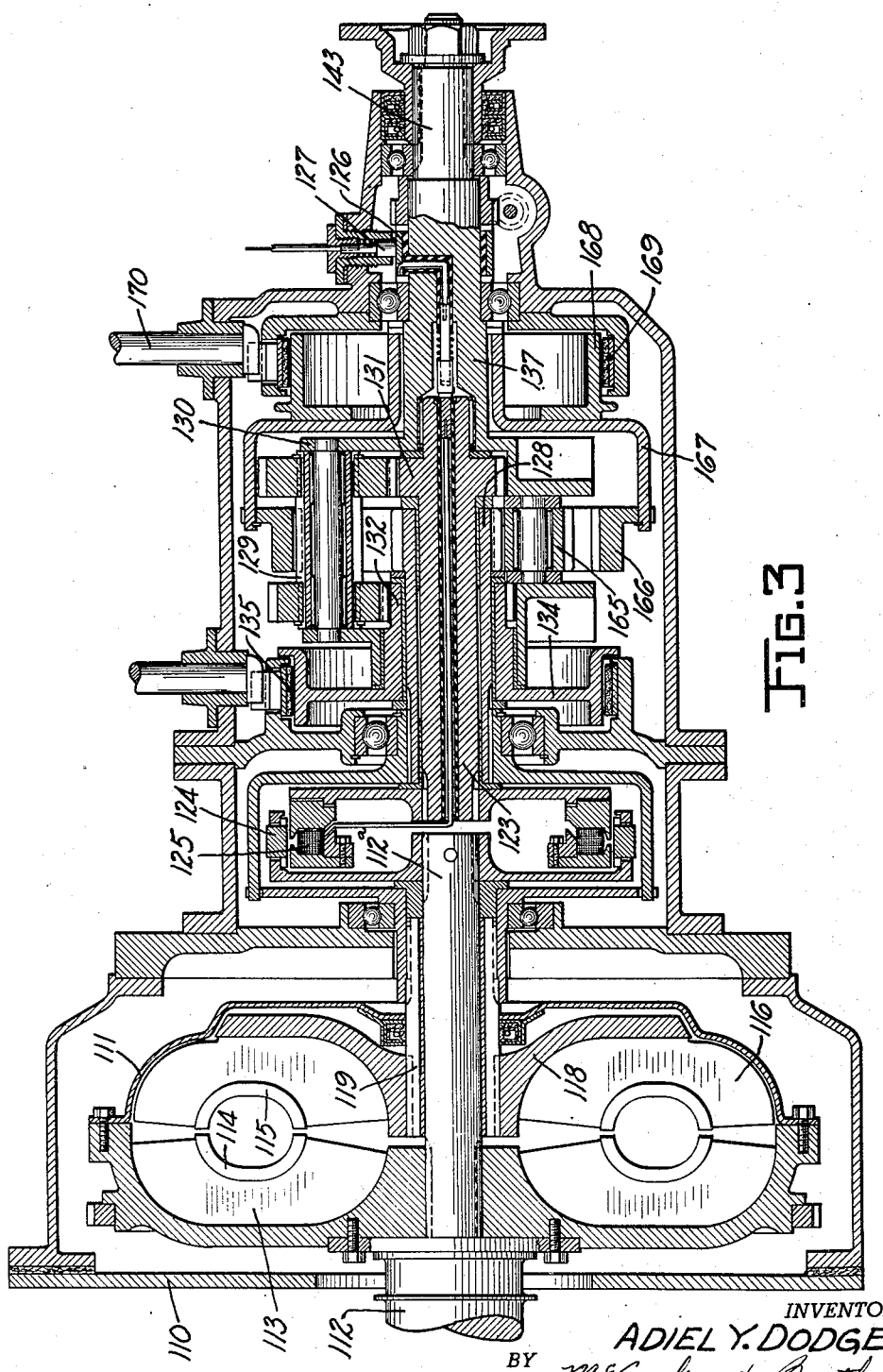
Figure 3 is an axial section of still another construction.

The transmission illustrated in Figure 3 is substantially similar to that of Figure 1, and parts therein corresponding to like parts in Figure 1 have been indicated by the same reference numerals plus 100. In this construction, the hydraulic torque converter 11 of Figure 1 is shown as being replaced by a hydraulic clutch 111 which may be of the construction more particularly described and claimed in my copending application Serial No. 52,530, filed December 2, 1935, including a series of impeller vanes 113 and a series of rotor vanes 116. The impeller casing in which the impeller vanes 113 are carried is bolted to the driving shaft 112, and the rotor vanes are carried by a hub 118 connected to the sleeve 119. The sleeve 118 is connected to a sun pinion 128 which replaces the ring gear 28 of Figure 1. The sun pinion 128 meshes with a series of idlers 165 which in turn mesh with the planet pinions 129. In this way the sun pinion 128 is made to act in substantially the same manner as the gear 28 of Figure 1. The clutch 124 is shown as being of the external contracting type actuated by a solenoid 125 supplied with current through a slip ring 126 and brush 127 and connects the shaft 123 on which the sun pinion 131 is carried to an extension 112a of the driving shaft 112. This clutch functions in a manner substantially similar to that of the clutch 24 of Figure 1.

In the construction of Figure 3, reverse drive is obtained through the same planet gear set by providing a ring gear 166 meshing with the elongated planet pinions 128 and carried by a cage 167 which terminates in a brake drum 168. A brake 169 controlled through a shaft 170 engages the drum 168 to hold it stationary when reverse drive is desired.

The several forward speed ranges of the transmission of Figure 3 are substantially similar to those of Figure 1, one such range being obtained when the clutch 124 is disengaged, and the brake 125 is engaged, and the other two-path range being obtained when clutch 124 is engaged and brake 125 is disengaged. For reverse drive the brake 169 is engaged holding the ring gear 166 stationary. If the clutch 124 is disengaged the pinion 128 will be driven by the rotor 116 through the sleeve 119 and will drive the planet pinions 128 through the idlers 165. Due to the presence of the idlers 165 this will cause the pinions 129 and gear carrier 130 to planetate in a direction reverse to that of the gear 128 and to drive the shaft 143 in the reverse direction. Since the fluid clutch will transmit only engine torque to the shaft 119 the engine may be operated at all times at a speed at which it will produce a relatively high torque and for some types of service this may be an advantage.

While several embodiments of the invention have been shown and described in detail it will be understood that they are illustrative only and are not intended as a definition of the scope of the invention, reference being had for this purpose to the appended claims.

What is claimed is:

1. A transmission for connecting a driving shaft to a driven shaft comprising a differential gear chain having one element connected to the driven shaft, an infinitely variable speed torque-multiplying device including a driving member connected to the driving shaft, a driven member connected to another element of the gear set and a reaction member forming a fulcrum for torque multiplication, said gear chain including an element held against rotation to provide a fulcrum for low range driving through the connections described above, and controllable clutch means to connect a third element of the gear chain to the driving shaft whereby by controlling said clutch means, the drives may be changed from the single path drive including said device and said gear set to a two path drive including said clutch means in one path and said device in the other to provide two-path higher range driving connections.

2. A transmission for connecting a driving shaft to a driven shaft comprising a differential gear chain having one element connected to the driven shaft, a hydraulic infinitely variable speed torque-transmitting device including a vaned driving member connected to the driving shaft, a vaned driven member connected to another element of the gear chain, and a vaned reaction member forming a fulcrum for torque multiplication, said gear chain including an element held against rotation to provide a fulcrum for low range driving through the connections described above, and controllable clutch means to connect the driving shaft to a third element of the gear chain whereby by controlling said clutch means, the drives may be changed from the single path drive including said device and said gear set to a two path drive including said clutch means in one path and said device in the other to provide two-path higher range driving connections.

3. A transmission for connecting a driving shaft to a driven shaft comprising a differential gear chain having one element connected to the driven shaft, infinitely variable speed electrical driving means including a driving member connected to the driving shaft and a driven member electrically driven by the driving member and connected to another element of the gear chain, said gear chain including an element held against rotation to provide a fulcrum for low range driving through the connections described above, and controllable clutch means to connect the driving shaft to a third element of the gear chain whereby by controlling said clutch means, the drives may be changed from the single path drive including said device and said gear set to a two path drive including said clutch means in one path and said device in the other to provide two-path higher range driving connections.

4. A transmission for connecting a driving shaft to a driven shaft comprising a differential gear chain having one element connected to the driven shaft, infinitely variable speed electrical driving means including a driving member connected to the driving shaft, a driven member electrically driven by the driving member and connected to another element of the gear chain, and a reaction member electrically associated with the driving and driven members and forming a fulcrum for torque multiplication, said gear chain including an element held against rotation to provide a fulcrum for low range driving through the connections described above, and controllable clutch means to connect the driving shaft to a third element of the gear chain whereby by controlling said clutch means, the drives may be changed from the single path drive including said device and said gear set to a two path drive including said clutch means in one path and said device in the other to provide two-path higher range driving connections.

5. A transmission for connecting a driving shaft to a driven shaft comprising a hydraulic variable speed unit including a vaned driving member connected directly to the driving shaft and a vaned driven member, means connecting the driven member to the driven shaft, and a brake engageable with said driving member to restrain it and the driving shaft from rotation so that the hydraulic unit will act yieldingly to resist rotation of the driven shaft.

6. A transmission for connecting a driving shaft to a driven shaft comprising a hydraulic variable speed unit including a vaned driving member connected directly to the driving shaft a vaned driven member and a vaned reactance member, means holding the reactance member against reverse rotation only, means connecting the driven member to the driven shaft, and a brake engageable with one of said members other than the driven member to restrain it from rotation so that the hydraulic unit will act yieldingly to resist rotation of the driven shaft.

7. A transmission for connecting a driving shaft to a driven shaft comprising an infinitely variable speed and torque unit having driving and driven members, a compound differential gear set comprising two sun gears, one ring gear and one set of planet gears meshing with both of said sun gears and with said ring gear, means connecting one sun gear to be driven by the driving shaft, the other sun gear being free to revolve, means to hold said other sun gear against rotation, the ring gear being connected to the driven member of said unit and the planet cage being connected to the driven shaft to provide a single variable path of power flow in series with a mechanical gear reduction when the second sun gear is held against rotation and to provide two paths of power flow when the second sun gear is free to revolve and said one sun gear is connected to the driving shaft.

8. A transmission for connecting a driving shaft to a driven shaft comprising an infinitely variable speed and torque unit having driving and driven members, a compound differential gear set comprising two sun gears, one ring gear and one set of planet gears meshing with both of said sun gears and with said ring gear, means connecting one sun gear to be driven by the driving shaft, the other sun gear being free to revolve, one-way brake means to hold said other sun gear against rotation in a reverse direction, the ring gear being connected to the driven member of said unit and the planet cage being connected to the driven shaft to provide a single variable path of power flow in series with a mechanical gear reduction when the second sun gear is held against rotation by said one-way brake, and to provide two paths of power flow when said one sun gear is connected to the driving shaft and the second sun gear is overrunning said one-way brake.

ADIEL Y. DODGE.